United States Patent
Desjoyeaux et al.

(10) Patent No.: US 9,518,509 B2
(45) Date of Patent: Dec. 13, 2016

(54) METHOD FOR MANUFACTURING A STRUCTURE WITH CELLULAR CORES FOR A TURBOJET NACELLE

(71) Applicant: AIRCELLE, Gonfreville L'Orcher (FR)

(72) Inventors: Bertrand Desjoyeaux, Sainte Adresse (FR); Thierry Deschamps, Heuqueville (FR); John Moutier, Le Havre (FR)

(73) Assignee: AIRCELLE, Gonfreville L'Orcher (FR)

( * ) Notice: Subject to any disclaimer, the term of this patent is extended or adjusted under 35 U.S.C. 154(b) by 170 days.

(21) Appl. No.: 14/635,667

(22) Filed: Mar. 2, 2015

(65) Prior Publication Data

US 2015/0267613 A1    Sep. 24, 2015

Related U.S. Application Data

(63) Continuation of application No. 13/148,057, filed as application No. PCT/FR2010/000019 on Jan. 8, 2010, now abandoned.

(30) Foreign Application Priority Data

Feb. 5, 2009 (FR) .................................. 09 00500

(51) Int. Cl.
*F02C 7/04* (2006.01)
*B32B 3/12* (2006.01)
(Continued)

(52) U.S. Cl.
CPC .  *F02C 7/04* (2013.01); *B32B 3/12* (2013.01); *B32B 3/18* (2013.01); *B32B 3/266* (2013.01); *B32B 5/142* (2013.01); *B32B 5/24* (2013.01); *B32B 7/12* (2013.01); *B32B 15/04* (2013.01); *B32B 15/14* (2013.01); *B32B 15/20* (2013.01); *B32B 37/12* (2013.01); *B32B 38/0012* (2013.01); *F02K 1/827* (2013.01); *G10K 11/172* (2013.01); *B32B 2038/0052* (2013.01); *B32B 2307/102* (2013.01); *B32B 2307/50* (2013.01);

(Continued)

(58) Field of Classification Search
CPC .......... F02B 77/13; G10K 11/168; E04B 1/82; E04B 1/84; E04B 1/86
USPC ............. 415/19; 60/725; 181/204, 205, 292; 261/111.2; 428/593
See application file for complete search history.

(56) References Cited

U.S. PATENT DOCUMENTS 6,720,060 B1 *  4/2004  Swars ...................... B01J 35/04
                                                       422/177
7,954,224 B2 *  6/2011  Douglas .................... B32B 3/12
                                                       261/112.2

(Continued)

*Primary Examiner* — Jason L Vaughan
(74) *Attorney, Agent, or Firm* — Burris Law, PLLC

(57) ABSTRACT

The present disclosure related to a method for manufacturing a structure with cellular cores that can be used in a structural panel of a turbojet nacelle, including at least one block of cellular cores. The at least one block of cellular cores includes a central portion with core honeycomb cells, and two side portions each including side honeycomb cells. The side honeycomb cells have edge honeycomb cells situated on edges of a side part of a block, and adjacent honeycomb cells. In particular, the method includes: A) forming junction walls on the side honeycomb cells by opening the edge honeycomb cells, the junction walls being capable of interacting for forming a junction area; B) unfolding the junction walls thus formed in step A; and C) joining the junction walls thus unfolded in step B and belonging to two different side portions end-to-end.

5 Claims, 3 Drawing Sheets

(51) Int. Cl.
*B32B 3/18* (2006.01)
*F02K 1/82* (2006.01)
*G10K 11/172* (2006.01)
*B32B 37/12* (2006.01)
*B32B 38/00* (2006.01)
*B32B 5/14* (2006.01)
*B32B 5/24* (2006.01)
*B32B 7/12* (2006.01)
*B32B 15/04* (2006.01)
*B32B 15/14* (2006.01)
*B32B 15/20* (2006.01)
*B32B 3/26* (2006.01)

(52) U.S. Cl.
CPC .... *B32B 2307/546* (2013.01); *B32B 2307/724* (2013.01); *B32B 2307/7242* (2013.01); *B32B 2605/18* (2013.01); *Y02T 50/672* (2013.01); *Y10T 137/0536* (2015.04); *Y10T 156/1003* (2015.01); *Y10T 428/192* (2015.01); *Y10T 428/24149* (2015.01)

(56) References Cited

U.S. PATENT DOCUMENTS

| | | | | |
|---|---|---|---|---|
| 8,047,326 B2* | 11/2011 | Valleroy | .............. | G10K 11/172 181/210 |
| 8,273,204 B2* | 9/2012 | Vache | ................. | B29C 67/0044 156/196 |
| 2011/0200786 A1* | 8/2011 | Douglas | ................... | B32B 3/12 428/116 |

* cited by examiner

METHOD FOR MANUFACTURING A STRUCTURE WITH CELLULAR CORES FOR A TURBOJET NACELLE

CROSS-REFERENCE TO RELATED APPLICATIONS

This application is a continuation U.S. application Ser. No. 13/148,057, filed Aug. 5, 2011 which is a 371 Application of International Application No. PCT/FR2010/000019, filed on Jan. 8, 2010, and claims the benefit of FR 09/00500, filed on Feb. 5, 2009. The disclosures of the above applications are incorporated herein by reference.

FIELD

The present disclosure relates to a method for making a structure with cellular cores for use in a structural panel for a turbojet nacelle.

The invention also relates to a panel and a nacelle including such a structure with cellular cores.

BACKGROUND

The statements in this section merely provide background information related to the present disclosure and may not constitute prior art.

Airplane turbojet engines are surrounded by a nacelle to protect them and ensure the operation thereof. The nacelle is made up of walls composed of non-structural panels and structural panels. The latter parts ensure a sufficient stiffness of the nacelle. To that end, structural panels usually have one or more layers of cellular core structures (commonly called "honeycomb" structures). These layers are generally covered with a skin on their so-called outer face, i.e. the face radially furthest from the axis of the engine, and on their inner face, i.e. the face radially closest to the axis of the engine.

The structural panel is then assembled by arranging the different skins and layers, which are then pasted on a mold with the required shape. The assembly is cured in a furnace so as to grip the layers and polymerize the adhesives.

In parallel, turbojet engines generate substantial noise pollution. There is therefore a strong demand aiming to reduce this pollution, and even more so given that the turbojet engines used are becoming increasingly powerful.

To that end, some of the panels used are acoustic structural panels whereof the layers are generally covered on the outer face with an air-impermeable skin, called "solid," and on the inner face with an air-permeable perforated skin, called "acoustic."

The structural acoustic panel can also comprise several layers of cellular core structures between which a multi-perforated skin, called a "septum," is located. This skin is adhered between the cellular core structures by heating during the assembly/gluing phase of the panel.

Such panels constitute acoustic resonators able to "trap" the noise and therefore attenuate the sound emissions towards the outside of the nacelle.

In a known manner, a cellular core structure comprises at least one cellular core block comprising a central part having core honeycomb cells and two lateral parts each having a plurality of honeycomb joining cells.

The acoustic properties of the acoustic structural panel, i.e. its noise absorption rate as a function of the frequency and sound level of the noise, depend in particular on the joining of the cellular core block(s).

The join of the cellular joining cells is commonly done using a foaming adhesive, such as the FM410® adhesive, which has a significant expansion capacity. The adjacent edges of the cellular core block(s) are coated with the adhesive, which, when it expands, blocks the honeycomb cells by creating overthicknesses.

The use of adhesive requires too long a placement and cutout time of the overthicknesses from an industrial perspective.

Furthermore, these overthicknesses have the drawback of decreasing the effective acoustic surface of the cellular core structure as well as causing abrupt impedance interruptions, which contributes to decreasing the acoustic performance of the acoustic panel during the operation of the turbojet engine.

Also known from application WO2008/113904 is a structure with cellular cores whereof the honeycomb edge cells situated on the edges of several blocks with cellular cores making up said structure have been sectioned, then fitted together to join said blocks.

However, such a structure with cellular cores requires maintenance by stressing the cellular core structure, which makes production more complex.

Moreover, this embodiment does not make it possible to obtain optimal bending strength.

SUMMARY

The present invention provides a cellular core structure that is easy to manufacture and has good bending strength and that is able to effectively absorb the noise from the turbojet engine in an acoustic panel.

To that end, according to a first aspect, the invention relates to a method for manufacturing a structure with cellular cores that can be used in the structural panel of a turbojet nacelle, including at least one block of cellular cores having a central portion with core honeycomb cells and at least two side portions each including side honeycomb cells, wherein said method includes the following steps:

A) forming junction walls on the side honeycomb cells, the junction walls being capable of interacting for forming a junction area;

B) unfolding the junction walls thus formed; and

C) joining the walls thus unfolded and belonging to two different side portions end-to-end so that said junction walls are fitted together so as to form a junction area.

The joining of one or more cellular core blocks by fitting junction walls together makes it possible to avoid stressing the structure obtained using the inventive method. Indeed, the junction is made by simply interweaving said walls without the latter necessarily being in contact.

The bending strength is improved. In fact, the majority of the junction walls not being in contact with each other, they can each deform freely without impacting the other walls. Moreover, the stresses pass through the outer skins from one outer skin to the other, which makes it possible to prevent the concentration of forces in the axis of the joint.

Furthermore, the cellular core structure obtained using the inventive method has the advantage of not obstructing the honeycomb cells at the joints of the cellular core blocks. As a result, the cellular core structure very effectively absorbs the noise from the operation of the turbojet engine.

According to other features of the invention, the inventive method comprises one or more of the following features, considered alone or according to all possible combinations:

the length (e) of each junction wall is greater than or equal to the largest length of the side and/or core honeycomb cells, which makes it possible to improve the bending strength;

the side parts belonging to cellular core blocks whereof the side and core honeycomb cells have different sizes are joined end-to-end, which makes it possible to adapt the mechanical strength of the structure as needed;

in step A, one opens the edge honeycomb cells situated on the edges of a side part of a block intended to be joined and honeycomb cells adjacent to the edge honeycomb cells so as to form the junction walls, which allows a simple and effective formation of the junction walls;

the edge and adjacent honeycomb cells are opened by section to a lateral side and/or a wall of a honeycomb cell;

the inventive method comprises an additional step D in which the fitting done in step C is maintained by fastening members, in particular by clamps or staples, which makes it possibly to durably maintain the cellular core structure without stress.

According to a second aspect, the invention relates to a structural panel for a nacelle surrounding a turbojet engine, characterized in that it is equipped with at least one cellular core structure obtained using the inventive method.

In one form, the panel according to the invention is an acoustic panel whereof the cellular core structure(s) are coated on one of their faces with an outer skin impermeable to air and on their other face with a perforated inner skin, which makes it possible to benefit from the advantages of said structure in an acoustic structural panel.

According to one preferred alternative, the inventive panel includes at least two cellular core structures superimposed one on the other, which makes it possible to strengthen the mechanical rigidity of the panel according to the invention.

According to another aspect, the invention relates to an aircraft engine nacelle, characterized in that it comprises at least one panel according to the invention.

In another form, the structural panel(s) are situated in the air intake zone of said nacelle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

The invention will be better understood upon reading the following non-limiting description, done in reference to the appended figures.

Figure 1:
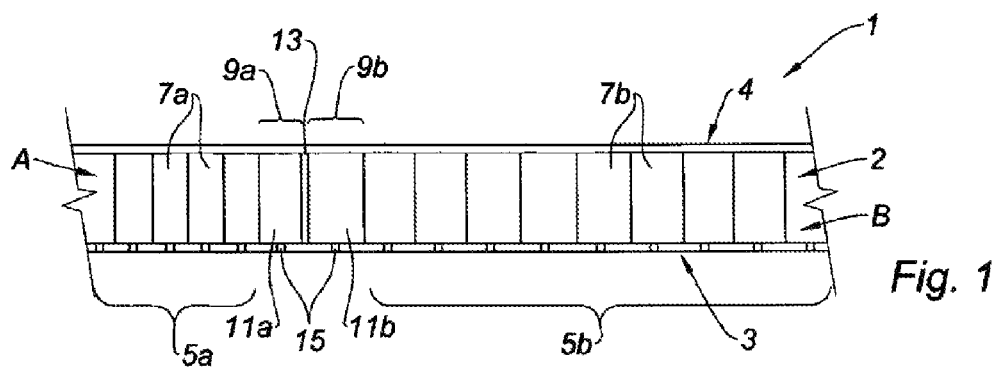
FIG. 1 is a cross-sectional view of a single-layer structural panel according to the present invention.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As shown in FIG. 1, the structural panel 1 according to the invention can be a single-layer acoustic panel comprising a cellular core structure 2 according to the invention formed by one or more, and in this case two cellular core blocks A and B joined together. In the event a single cellular core block is used, it is joined on itself to form a cellular core structure, for example by forming a substantially cylindrical structure that can be used in a nacelle air intake.

The cellular core block(s) A and B used can have any geometric shape, such as square, or any other suitable shape.

In the event the inventive structure includes a plurality of cellular core blocks A, B defining a plurality of junction zones, it is then possible to choose each block to obtain the desired mechanical strength and, if applicable, the desired acoustic absorption.

The cellular core structure 2 is sandwiched between an inner skin 3 and an outer skin 4, which allow the transition of mechanical stresses. Furthermore, the presence of these skins 3 and 4 makes it possible to keep the cellular core structure 2 in a single element.

These two cellular core blocks A, B include a central portion 5 comprising core honeycomb cells 7a, 7b and typically several, in this case two side portions 9a, 9b each comprising a plurality of side honeycomb cells 11a, 11b. A block can for example include at least four side portions. The side honeycomb cells 11a, 11b of each block A and B are adjacent to the junction zone 13, the features of which will be detailed below.

Figure 3:
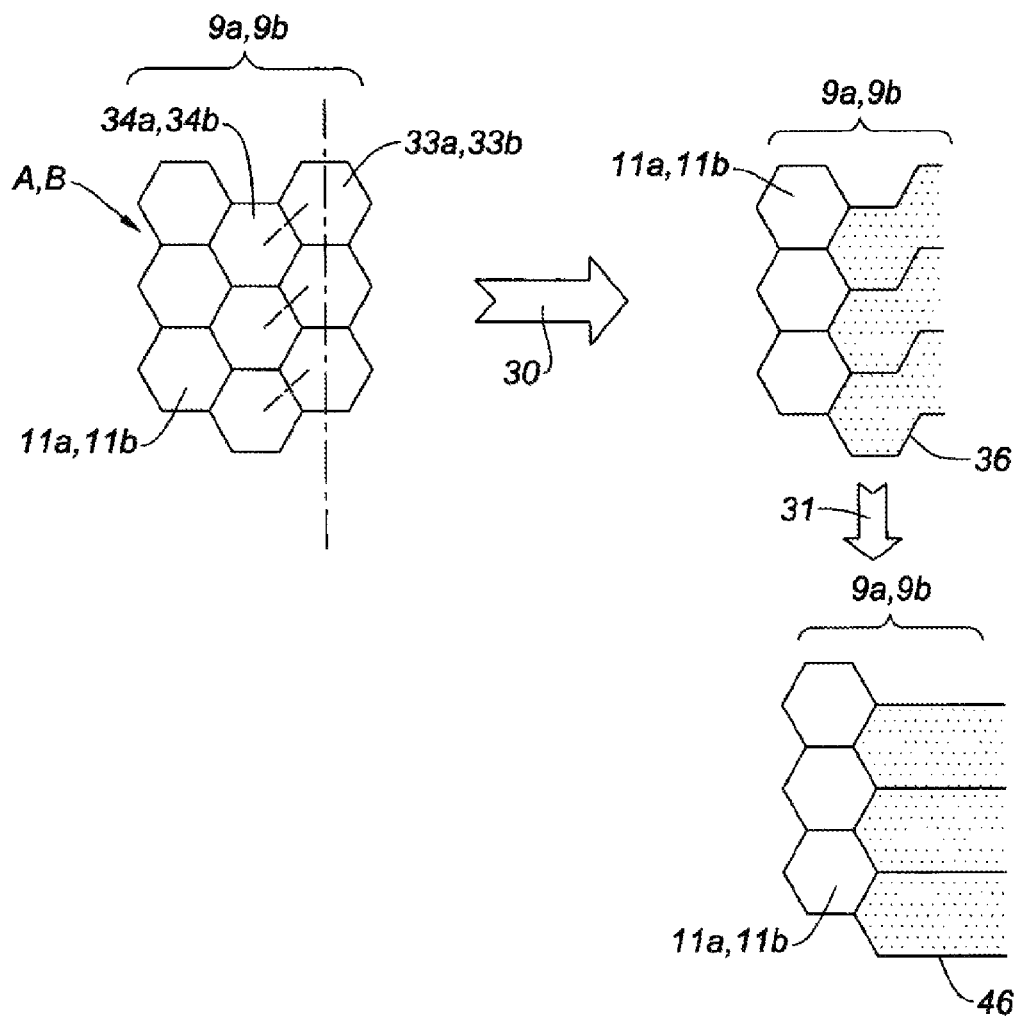
FIG. 3 is a diagrammatic view of the inventive method.
Figure 4:
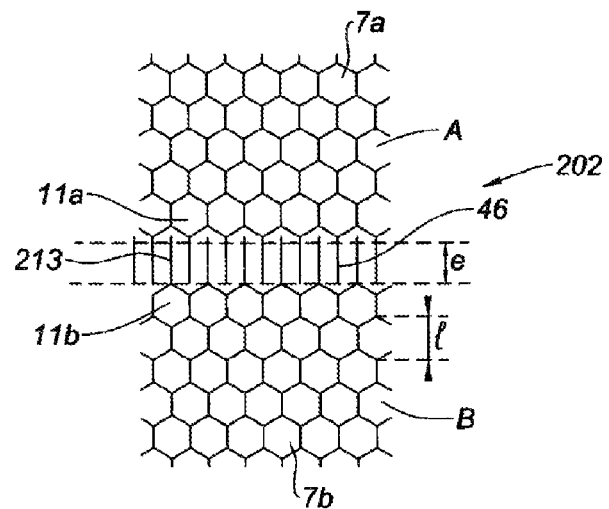
FIG. 4 is a top view of a structure obtained at the end of the inventive method.

As shown in FIGS. 3 and 4, the core honeycomb cells 7a, 7b and the side honeycomb cells 11a, 11b in this case have hexagonal sections, thereby forming so-called honeycomb structures. It is possible for said honeycomb cells 7a, 7b and 11a, 11b to have sections with any geometric shape other than hexagonal.

As shown in FIG. 1, the section of the core 7a and side 11a honeycomb cells of the block A can for example be smaller than that of the core 7b and side 11b honeycomb cells of the block B, so as to meet the acoustic and/or mechanical stresses imposed by the manufacturer's specifications.

Preferably, the side 11a, 11b and core 7a, 7b honeycomb cells are made of metal, an alloy, or a composite material so as to facilitate the production of the core 7a, 7b and side 11a, 11b honeycomb cells and to impart good mechanical strength to the latter. The material forming the inner skin 3 can be made in a metal material, such as aluminum or titanium, or fabric, and the material forming the outer skin 4 can be a multi-layer composite material or a metal material such as aluminum or titanium.

The structural panel 1 as shown in FIG. 1 is an acoustic panel. In this case, the inner skin 3 includes perforations 15 located facing the core 7a, 7b and side 11a, 11b honeycomb cells. In this way, the structural panel 1 can absorb the sound annoyance created by the operation of the turbojet engine.

Figure 2:
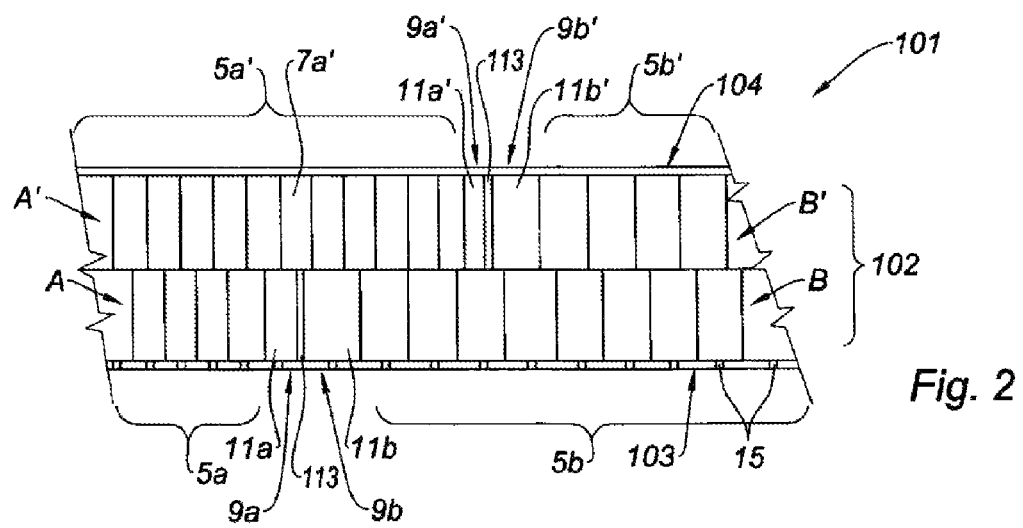
FIG. 2 is a cross-sectional view of a dual-layer structural panel according to the present invention.

In an alternative shown in FIG. 2, the structural panel 101 is a dual-layer panel according to the invention comprising two layers of cellular core blocks, respectively formed by blocks A, B and A', B'. Said layers are assembled together by known means and sandwiched between an inner skin 103 and an outer skin 104 similar to those of FIG. 1. The other elements forming the structural panel 101 are identical to those of the structural panel 1 shown in FIG. 1, the corresponding references being the same.

According to one alternative, it is possible to obtain a structural panel including a number of layers of cellular core blocks greater than 2, in particular greater than or equal to 3.

In this dual-layer panel, the cellular core blocks A, B on the one hand, and A', B' on the other are joined together in one or more joint zones 113.

The operating principle of an acoustic panel like those 1 and 101 shown in FIGS. 1 and 2 is known in itself; the panel 1, 101 is intended to be mounted in the inner wall of an aircraft nacelle, preferably in the air intake zone of said nacelle, so that the inner skin 3, 103 is located opposite the engine located in said nacelle.

The noise emitted by this engine penetrates the honeycomb cells A, B via orifices 15 situated in the inner skin 3, 103, and vibrates inside these core 7a, 7b and side 11a, 11b honeycomb cells that make up the acoustic resonators. In this way, a dissipation of the acoustic energy and subsequent reduction of the noise level are possible. In order to improve the acoustic absorption, it is possible to apply a perforated skin, also called septum, between the two layers of blocks with a cellular core A, B and A', B' of the structural panel 101 so that the core 7a', 7b' and side 11a', 11b' honeycomb cells of the blocks A' and B' also make up acoustic resonators.

According to the embodiment shown in FIGS. 3 and 4, the cellular core structure 202 used in the structural panel according to the invention is obtained using the inventive method, which includes a step A, symbolized by the arrow 30, a step B, symbolized by the arrow 31, and a step C (not shown).

In step A, junction walls 36 are formed on the side honeycomb cells 11a and 11b, the junction walls 36 being able to cooperate to form a joint zone.

To that end, according to the embodiment shown in FIG. 3, the edge honeycomb cells 33a, 33b are opened situated on the edges of a side part 9a, 9b of one or more blocks A, B intended to be joined and the adjacent honeycomb cells 34a, 34b to the edge honeycomb cells 33a, 33b so as to form the junction walls 36. In this way, advantageously, junction walls 36 are formed on the side honeycomb cells 11a and 11b, the junction walls 36 being able to cooperate to form a joint zone.

In this embodiment, the edge 33a and 33b and adjacent 34a and 34b honeycomb cells are opened by section on a lateral side and/or a wall of a honeycomb cells using any means known by those skilled in the art. Thus, for example, it is possible to make a cutout using a cutting tool such as a pair of scissors.

According to another embodiment not shown, it is possible to use one or more cellular core blocks whereof the junction walls are formed during the production of said block(s). According to another embodiment, the junction walls can be attached using any means known by those skilled in the art on a cellular core block already formed.

In step B, the junction walls 36 thus formed are unfolded using any means known by those skilled in the art, in particular by using a clip. The deployment of the junction walls 36 thereby makes it possible to obtain a larger length of the joint zone.

As shown in FIG. 4, in step C, the walls thus unfolded 46 belonging to two different side parts 9a and 9b are joined end-to-end so that said junction walls 46 fit together to form a joint zone 213.

Advantageously, the cellular core structure obtained using the method according to the present invention has the advantage of not obstructing the honeycomb cells at the junction of the cellular core blocks. As a result, the inventive structure effectively absorbs the noise coming from the operation of the turbojet operation.

According to one alternative, the junction walls 46 are unfolded so as to arrange them substantially parallel to each other so that the junction walls 46 thus unfolded fit together like a comb.

The structure according to the invention 201 can be formed by a single block joined on itself or by joining a plurality of cellular blocks, in particular two blocks A, B or three cellular blocks.

The unfolded junction walls 46 can advantageously have a length e greater than or equal to the largest length l of a larger side or core honeycomb cell.

The largest length l is defined as the greatest distance between two edges of the honeycomb cell that are not immediately adjacent. In the case of regular honeycomb cells, this largest length l corresponds to the diameter of the circle inscribed or marked out of the largest honeycomb cell.

Figure 5:
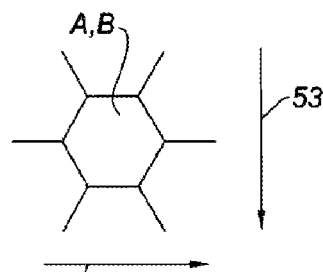
FIG. 5 is a front view of a honeycomb cell used in the present invention.

The fitting together in step C can be done in the "ribbon" direction 51, corresponding to the orientation of the cellular core block A, B before expansion (see FIG. 5). The direction of "expansion" 53 corresponds to a direction perpendicular to the ribbon direction 51 (see FIG. 5). In one alternative, it is also possible to join one block in the "ribbon" direction and another block in the "expansion" direction.

The "expansion" direction designates the direction in which the core 7a, 7a', 7b, 7b' and side 11a, 11a', 11b, 11b' honeycomb cells are opened so as to form open cells able to trap sound and thereby form the honeycomb structure.

Thus in the case shown in FIG. 3, the fitting together is done in the ribbon direction.

Figure 6:
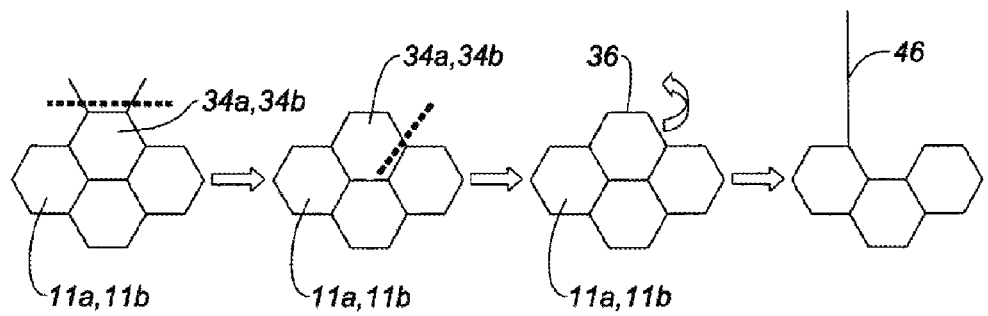
FIG. 6 is an alternative of the embodiment of FIG. 3.

It is also possible for the opening of the honeycomb cells 11a, 11b to allow fitting together in the expansion direction, as shown in FIG. 6.

According to one embodiment, in step C, at least two cellular core blocks whereof the side and core honeycomb cells are different sizes are joined end-to-end. According to one alternative, a same cellular core block can have side and core honeycomb cells of different sizes.

Thus, in the event at least two cellular core blocks of different sizes are joined, the largest length l is taken relative to the largest side and core honeycomb cells present in block A and/or block B.

In the event two blocks are joined including side and core honeycomb cells of substantially the same size, the largest length l can be taken relative to any side or core honeycomb cells.

According to one embodiment, the inventive method can comprise an additional step D in which the fitting together done in step C is maintained using fastening members.

The fastening members are for example clamps or staples, which makes it possible to ensure good maintenance.

The junction can be maintained by compacting in a bladder before curing prior to applying a usual glue between the cellular core blocks thus joined to fasten the outer skin.

The structure 2, 102, 202 obtained using the inventive method has one or more joint zones 13, 113 and 213, which are not stressed. Thus, the implementation of the method is simplified compared to the embodiments described in the prior art.

Furthermore, the majority of the junction walls 46 are not in contact, which makes it possible to ensure good bending strength. In fact, the junction walls 46 can each deform independently of the other junction walls. The interweaving of the cellular core blocks allows the passage of forces from one outer skin to the other so as to avoid a concentration of these forces in the axis of the junction.

What is claimed is:

1. A method for manufacturing a structure with cellular cores that can be used in a structural panel of a turbojet nacelle, including at least one block of cellular cores having;
   a central portion with core honeycomb cells; and
   at least two side portions each including side honeycomb cells, said side honeycomb cells comprising:
      edge honeycomb cells situated on edges of a side part of a block intended to be joined; and
      adjacent honeycomb cells adjacent to the edge honeycomb cells,
   wherein said method comprises:
   A) forming junction walls on the side honeycomb cells by opening the edge honeycomb cells, the junction walls being capable of interacting for forming a junction area;
   B) unfolding the junction walls thus formed in step A; and
   C) joining the junction walls thus unfolded in step B and belonging to two different side portions end-to-end so that said junction walls are fitted together so as to form a junction area.

2. The method according to claim 1, wherein a length of each junction wall is greater than or equal to a largest length of the side and/or core honeycomb cells.

3. The method according to claim 1, wherein the side portions of the cellular core blocks, whereof the side and core honeycomb cells are joined end-to-end.

4. The method according to claim 1, wherein the edge and adjacent honeycomb cells are opened by section to a lateral side and/or a wall of the core and side honeycomb cells.

5. The method according to claim 1, comprising an additional step D in which the joining done in step C is maintained by clamps or staples.

* * * * *